US006097308A

United States Patent [19]
Albert et al.

[11] Patent Number: 6,097,308
[45] Date of Patent: Aug. 1, 2000

[54] PAGER TO COMPUTER LINK APPARATUS

[75] Inventors: David E. Albert, Oklahoma City; Colin J. Cumming; Joel Roark, both of Stillwater, all of Okla.

[73] Assignee: Data Critical Corp., Oklahoma City, Okla.

[21] Appl. No.: 08/767,108

[22] Filed: Dec. 4, 1996

[51] Int. Cl.[7] .................................................. H04Q 1/00
[52] U.S. Cl. .................. 340/825.44; 439/929; 455/348
[58] Field of Search .................... 439/929, 76.1; 340/311.1, 825.44, 825.48; 455/347, 348

[56] References Cited

U.S. PATENT DOCUMENTS

| | | | |
|---|---|---|---|
| 3,337,992 | 8/1967 | Tolson | 340/825 |
| 4,806,906 | 2/1989 | Oda | 340/825.44 |
| 4,856,088 | 8/1989 | Oliwa | 340/311.1 |
| 4,857,883 | 8/1989 | Mama | 340/311.1 |
| 4,879,759 | 11/1989 | Matsumoto | 455/348 |
| 4,962,522 | 10/1990 | Marian | 340/825.44 |
| 4,967,194 | 10/1990 | Haruki | 340/825.44 |
| 5,043,721 | 8/1991 | May | 340/825.44 |
| 5,281,962 | 1/1994 | Vanden Heuvel | 340/825.44 |
| 5,353,017 | 10/1994 | Suzuki | 340/825.46 |

*Primary Examiner*—Brian Zimmerman
*Attorney, Agent, or Firm*—McAfee & Taft

[57] ABSTRACT

An adapter device for downloading stored data from a pager device to a digital computer. A pager device with holster includes an interface circuit board with transmission circuitry, either wired or wireless, for downloading logic level signal, data stored in the pager to a host digital computer for input via the RS-232C interconnect.

19 Claims, 3 Drawing Sheets

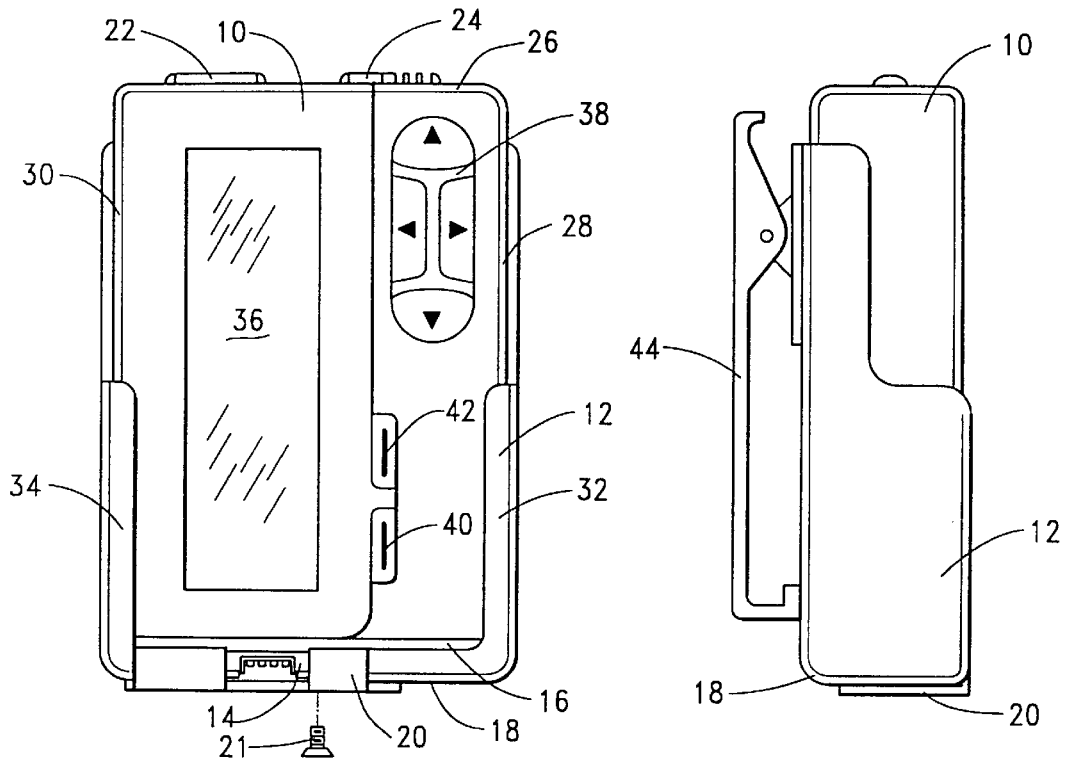
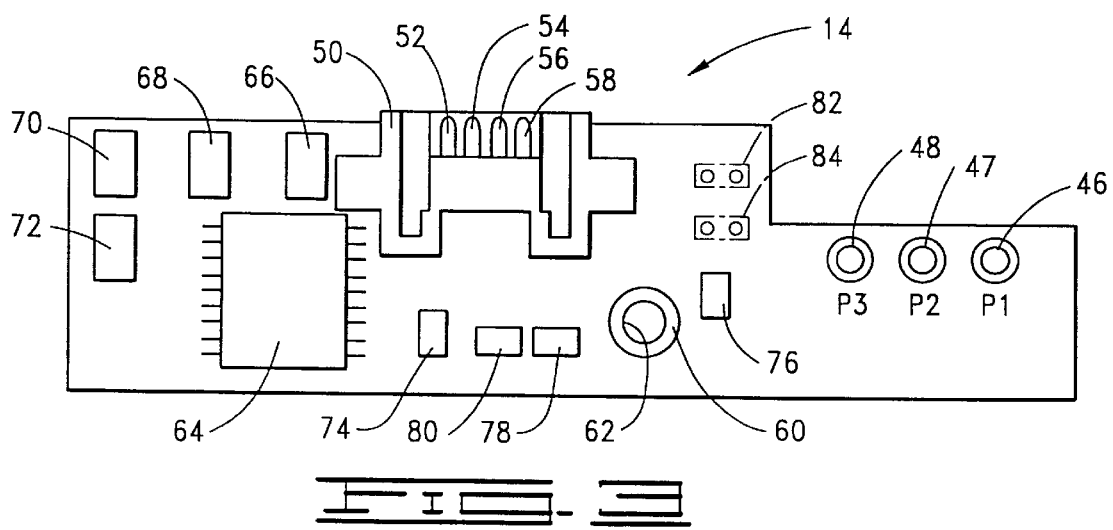

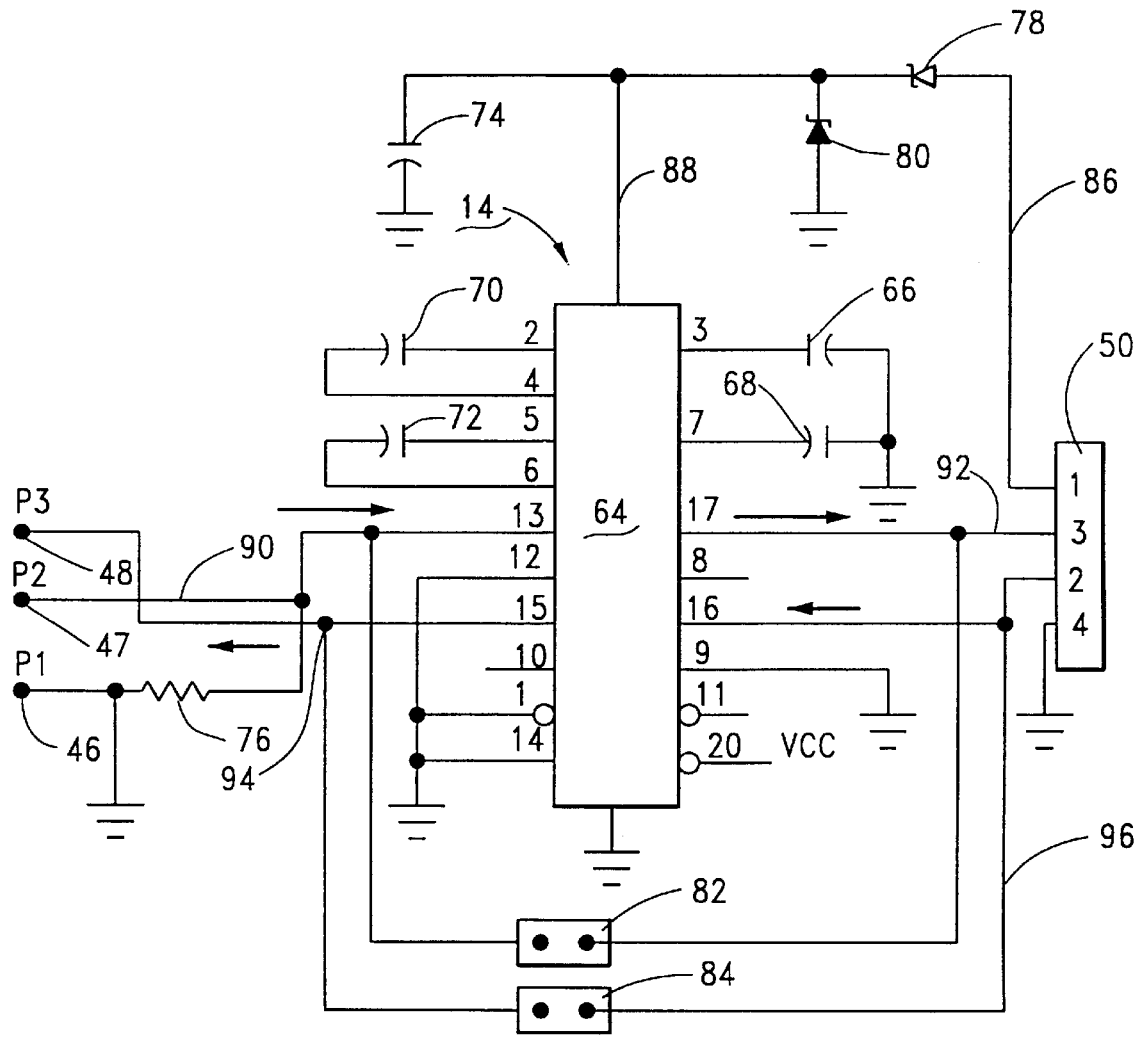
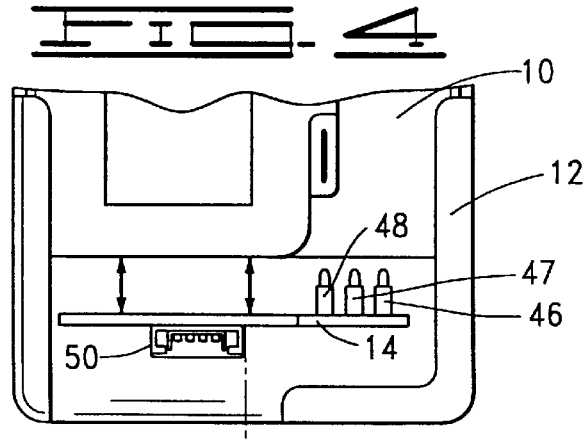
FIG. 4
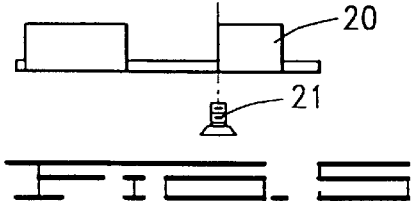
FIG. 5

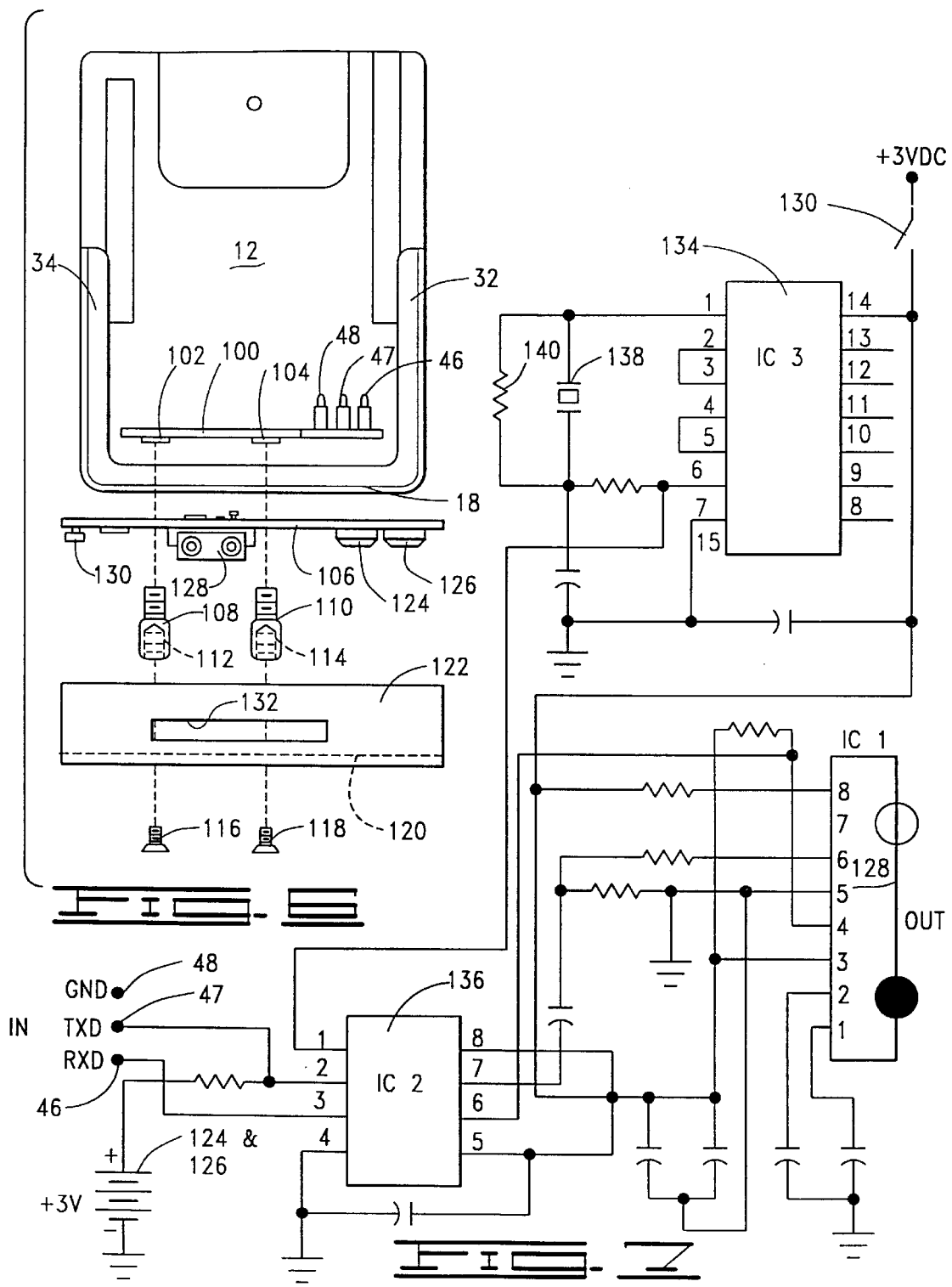

PAGER TO COMPUTER LINK APPARATUS

BACKGROUND OF THE INVENTION

1. Field of the Invention

The invention relates generally to an electronic data interconnection device and, more particularly, but not by way of limitation, it relates to both a wired and a wireless device for transferring data between a pager and a digital computer.

2. Description of the Prior Art

The prior art includes numerous types of transfer circuitry that utilize the existing RS-232C type of connector. Such linking devices for electrically connecting between a pager device and some associated computer would probably take the form of state-of-the-art interconnecting tape/cable teachings. However, Applicant has discovered no material prior teachings that relate to a wired or wireless type of transmission mode that originates from an interface adapter of miniaturized construction as retained between a pager and an associated holster, e.g., a belt-clip type of holster for aiding in carriage and portability.

SUMMARY OF THE INVENTION

The present invention relates to a commercially available pager device and its associated holster that is adapted to include an interface circuit board that is retained concisely in the base of the holster in electrical contact with the pager device. In one form, the interface circuit board may be connected via a multi-conductor cable and a standardized cable connector to the associated host computer. Alternatively, the interface circuit board may be energized to communicate by means of infrared radiation for pick-up and processing by the host computer. In either case, the data link is effective for downloading information stored in the pager device into the host computer.

Therefore, it is an object of the present invention to provide a compact interface unit for use in combination with a portable pager device.

It is also an object of the invention to provide a device for rapid download of data from pager storage to a host computer.

It is still further an object of the present invention to provide a device for establishing a quick, reliable data link between a pager and a host computer.

Finally, it is an object of the invention to provide a compact interface unit that may be disposed in a pager holster in contact with an associated pager device.

Other objects and advantages of the invention will be evident from the following detailed description when read in conjunction with the accompanying drawings that illustrate the invention.

BRIEF DESCRIPTION OF THE DRAWINGS

FIG. 1 is a front plan view in elevation of a pager device when positioned in a holster;

FIG. 2 is a side view in elevation of the paging device and holster of FIG. 1;

FIG. 3 is a plan view of the interface circuit board that is installed in the base of the holster device;

FIG. 4 is a schematic diagram of the circuitry that is present on the interface circuit board of FIG. 3;

FIG. 5 is an exploded view illustrating the manner in which the interface circuit board is installed in the base of the holster in contact with the pager device;

FIG. 6 is an exploded view of a wireless link, an alternative form of interface circuit board, as it is installed on the holster for contacting the associated pager device; and FIG. 7 is a schematic diagram of the circuitry included on the interface circuit board of FIG. 6.

DETAILED DESCRIPTION OF THE INVENTION

FIGS. 1 and 2 illustrate a well-known and commercially available pager device 10 that is disposed in combination with a holster 12 that functions to carry the pager 10 securely while maintaining portability. In this particular case, the pager device 10 is a type known as the Motorola Advisor™ as carried in its adaptive pager holster 12. The particular commercial pager is available with 32K*8 static random access memory. An interface circuit board 14 is disposed between the bottom panel 16 of pager 10 and base panel 18 of the holster 12. A protective cover 20 is then secured by a suitable screw fastener 21 to enclose the bottom structure.

The pager 10, i.e., the ADVISORS™ model, includes an on-off button 22 and power indicator 24 on the top panel 26 as the opposite side panels 28 and 30 are closely received within the captive side panels 32 and 34 of holster 12. A liquid crystal display screen 36 functions under control of front panel slewing buttons 38 as the push buttons 40 and 42 control respective receive and transmit functions of pager device 10. A spring clip 44 is used to secure the assembly on the belt or in a pocket in convenient manner.

Referring to FIG. 3, the interface circuit board 14 is adapted to carry all of the elements necessary to effect connection of a host computer to the pager 10. The circuit board 14 includes three pager connector pins 46, 47 and 48 which are a spring-loaded, gold-plated connector that provides connection to internal pager device circuitry. A male connector 50 having connector pins 52, 54, 56 and 58 is secured in circuit connection onto circuit board 14 and this connector 50 is a Molex part No. 89256 male connector that provides connection to the host computer by means of either a standard DB-9 female connector or, in the case of the Hewlett-Packard computer, an HP-10 female connector. The interconnecting multi-conductor cable (not shown) may be constructed with a cable length of about 18 inches having the Molex female plug on one end and the requisite computer female connector on the other end.

The interface circuit board 14 has a tap 60 secured therein having internal thread bore 62 for receiving the securing fastener 21 (FIG. 1). An integrated circuit chip 64 is a MAX 3223 voltage converter functioning in connection with capacitors 66, 68, 70, 72 and 74. A resistor 76 is disposed adjacent tap 60 while diodes 78 and 80 are mounted on the opposite side of tap 60 as jumper contacts pairs 82 and 84 are provided for test purposes. FIG. 4 illustrates schematically the electronic configuration of the interface circuit board 14. The interface board 14 converts industry standard RS-232C level signals for use by the advisor pager 10. The conversion is accomplished using a single chip solution provided by the integrated circuit Maxim 3223, a voltage converter. The chip is one of a family of chips that provides for RS-232C circuits while operating from a five volt supply. The device incorporates an internal DC-DC converter that performs the voltage conversion allowing operation with the higher voltage RS-232C compatible circuits.

The interface circuit 14 must draw power from the host computer and this is conducted on the DTR line, line 86 from pin No. 1 of connector 50 that is connected to the Schottky diode 78, the output of which is grounded through a Zener diode 80 to provide voltage regulation. A 2.2 microfarad capacitor 74 provides bypass for the supply voltage that is applied on lead 88 to the integrated circuit 64. The integrated circuit 64 incorporates an internal DC/DC converter that performs voltage conversion and allows operation with the higher voltage RS-232C compatible circuits. The other components (on the interface circuit board 14) are the capacitors 66, 68, 70 and 72 which are used by the internal DC/DC converter, and a pull down resistor 76 which is connected from a pager transmit line 90 to ground. A jumper pad 82 is connected in parallel with pager transmit line 90 and the transmit line 92 on the other side of integrated circuit 64, and a second jumper pad 84 is connected across the pager receive line 94 and the receive line 96 from the computer connector 50.

Referring to FIG. 5, connection to the pager 10 is achieved via the three spring-loaded pin connectors 46, 47 and 48 when the interface circuit board 14 is secured to the bottom side of pager 10 within holster 12 and fully assembled and secured by screw fastener 21. The interface circuit board 14 is shrouded by aluminum cover 20 which provides physical integrity as well as component protection while providing a means to lock the device into the holster 12. Thus, the cover 20 sandwiches the connector against the circuit board thus imparting a degree of physical integrity to the miniature connector 50. FIG. 5 illustrates the structure in partial assembly showing the manner in which circuit board 14 is installed with connector pins 46, 47 and 48 installed within respective connectors in the bottom of pager 10 as cover plate 20 and screw 21 maintain the assembly in rigid affixture.

FIGS. 6 and 7 deal with an alternative form of wireless transmission for download of pager data to a host computer device. FIG. 6 illustrates, in exploded form, a pager holster 12 (showing the inside), opposite side panels 32 and 34, and base panel 18. An interface circuit board 100 is positioned inside of holster base panel 18, the circuit board 100 includes a pair of threaded taps 102 and 104 as well as the three pager connector pins 46, 47 and 48, each spring-loaded connector pins. An adapter circuit board 106 is then secured across the outer surface of base panel 18 as secured by a pair of stand-off posts 108 and 110 that are secured through adapter circuit board 106 to respective internally threaded taps 102 and 104. The stand offs 108 and 110 have respective threaded holes 112 and 114 formed therein for the purpose of receiving threaded fasteners 116 and 118 through top panel 120 of cover shield 122. The adapter circuit board 106 carries two 1.5-volt batteries 124 and 126 as well as an infrared transmitter/receiver 128, a type HSDL-1004 infrared device. A miniature on-off switch 130 is accessible at the side of adapter circuit board 106, and shield 122 includes a viewing slit 132 for optical alignment with the infrared transmitter/receiver 128. Adapter circuit board 106 also carries a host of other circuit elements that are represented schematically in FIG. 7.

The circuitry consists of a clock circuit 134, modulation circuit 136 and infrared transmit/receive circuit 128. A crystal 138 connected in parallel with resistor 140 develops Sinewave input to pin 1 of the integrated circuit 134, a hex inverter type 74HC14. Clock output is generated on pin 6 of IC134 for input to pin 1 of the modulation/demodulation circuit, integrated circuit 136, a type PLX-1000.

In operation, the user having a pager 10/holster 12 combination with attachment as shown in FIG. 6, need only be in the proximity of a host computer to transfer any pager data using the wireless infrared transmission. An infrared detector may be plugged into the host computer in well-known manner whereupon the pager 10/holster 12 is placed next to the host computer with the transmitter/receiver element 128 directed through slot 132 in view of the infrared detector attachment on the host computer. The download system can be activated with the switch 130 to play out the stored data serially through the modulator circuit 136 under control of clock circuit 134 to energize the infrared T/R device 128 to project the infrared data for detection by the host computer IR detector (not shown).

The foregoing discloses both a wired and wireless type of downloading transmission system for use in download of pager stored information to a host computer for storage, further processing or other end use. The wired attachment provides a means for conducting stored data from the pager as logic level signals from the pager are converted to industry standard RS-232C level signal acceptable in the host computer. The wired transmission link interconnected via a short length of four-conductor cable from a standard Molex female connector to a multi-pin Hewlett-Packard female plug or, in most other computer applications, to a DB-9 female plug.

The alternative wireless mode downloading system utilizes infrared communication between an infrared attachment on the base of the pager/holster combination for detection of the serial infrared energy at the host computer for further processing of the data. While the two alternative modes deliver the same end result, there may be specific advantages dictating the type of system utilized in a particular application.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A pager to computer link apparatus, comprising:
   a holster providing a receptacle to receive a pager having connectors to enable external connections to be made with the pager, said holster including a wall defining part of the receptacle and facing the connectors of the pager when the pager is inserted in said holster;
   an interface circuit board disposed inside the receptacle adjacent said wall of said holster, said interface circuit board having contacts to engage the connectors of the pager when the pager is inserted in said holster; and
   an external member disposed on the other side of said wall of said holster and secured to said interface circuit board such that said interface circuit board and said external member clamp to said wall to affix said interface circuit board inside the receptacle of said holster.

2. A pager to computer link apparatus as defined in claim 1, wherein said external member includes an external cover secured to said interface circuit board by a screw fastener.

3. A pager to computer link apparatus as defined in claim 1, wherein said external member includes an adapter circuit board secured to said interface circuit board.

4. A pager to computer link apparatus as defined in claim 3, wherein said adapter circuit board has an infrared signal communication circuit mounted thereon, said infrared signal communication circuit connected to said contacts of said interface circuit board.

5. A pager to computer link apparatus as defined in claim 4, further comprising a cover disposed over said adapter circuit board, said cover having a viewing slit defined therein to permit infrared signals to pass across said cover.

6. A pager to computer link apparatus, comprising:

a holster providing a receptacle to receive a pager having connectors disposed at one side of the pager to enable external connections to be made with the pager, said holster including:
- a base panel defining part of the receptacle of said holster and facing the connectors of the pager when the pager is inserted in said holster, said base panel substantially coextensive with the side of the pager having the connectors; and
- a rim extending along only part of said base panel such that there is a space between an end of said rim and a sidewall of said holster extending from said base panel;

an interface circuit board disposed inside the receptacle adjacent said base panel of said holster, said interface circuit board having mounted thereon (a) contacts to engage the connectors of the pager when the pager is inserted in said holster and (b) means for communicating with a computer through the space between said rim and sidewall of said holster; and an external member disposed on the other side of said base panel of said holster and secured to said interface circuit board such that said interface circuit board and said external member clamp to said base panel to affix said interface circuit board inside the receptacle of said holster, said external member having an opening defined therein to correspond with at least part of the space between said rim and sidewall of said holster.

7. A pager to computer link apparatus as defined in claim 6, wherein said external member includes an external cover secured to said interface circuit board by a screw fastener.

8. A pager to computer link apparatus as defined in claim 7, wherein:

said means for communicating includes a mechanical connector; and said interface circuit board further has mounted thereon a d-c to d-c converter circuit connected between said contacts and said mechanical connector.

9. A pager to computer link apparatus as defined in claim 8, wherein said contacts include three pins to communicate electrical ground and receive and transmit data signals with the connectors of the pager.

10. A pager to computer link apparatus as defined in claim 9, wherein said holster is a standard holster of the type having a spring clip.

11. A pager to computer link apparatus as defined in claim 6, wherein said holster is a standard holster of the type having a spring clip.

12. A pager to computer link apparatus, comprising:

a holster providing a receptacle to receive a pager having connectors disposed at one side of the pager to enable external connections to be made with the pager, said holster including a base panel defining part of the receptacle of said holster and facing the connectors of the pager when the pager is inserted in said holster, said base panel substantially coextensive with the side of the pager having the connectors;

an interface circuit board disposed inside the receptacle adjacent said base panel of said holster, said interface circuit board having mounted thereon contacts to engage the connectors of the pager when the pager is inserted in said holster; and an adapter circuit board disposed on the other side of said base panel of said holster and secured to said interface circuit board such that said interface circuit board and said adapter circuit board clamp to said base panel to affix said interface circuit board inside the receptacle of said holster and said adapter circuit board outside said holster.

13. A pager to computer link apparatus as defined in claim 12, wherein said adapter circuit board has an infrared signal communication circuit mounted thereon, said infrared signal communication circuit connected to said contacts of said interface circuit board.

14. A pager to computer link apparatus as defined in claim 13, further comprising a cover disposed over said adapter circuit board, said cover having a viewing slit defined therein to permit infrared signals to pass across said cover.

15. A pager to computer link apparatus as defined in claim 14, further comprising at least one stand-off post passing through said adapter circuit board and secured to said interface circuit board, said stand-off post having a threaded hole defined therein to receive a screw fastener passing through said cover to retain said cover to said adapter circuit board.

16. A pager to computer link apparatus as defined in claim 13, wherein said infrared signal communication circuit mounted on said adapter circuit board includes:

a clock circuit;

a modulation circuit connected to said clock circuit and connected to the contacts of said interface circuit board providing transmit and receive communications with the pager when the pager is inserted in the holster; and an infrared transmit/receive circuit connected to said modulation circuit.

17. A pager to computer link apparatus as defined in claim 16, wherein said infrared signal communication circuit mounted on said adapter circuit board further includes:

a battery power source; and a switch to control energizing connection of said battery power source to said clock circuit, said modulation circuit and said infrared transmit/receive circuit.

18. A pager to computer link apparatus as defined in claim 12, further comprising a cover disposed over said adapter circuit board.

19. A pager to computer link apparatus as defined in claim 18, further comprising at least one stand-off post passing through said adapter circuit board and secured to said interface circuit board, said stand-off post having a threaded hole defined therein to receive a screw fastener passing through said cover to retain said cover to said adapter circuit board.

\* \* \* \* \*

UNITED STATES PATENT AND TRADEMARK OFFICE
CERTIFICATE OF CORRECTION

Patent No.: 6,097,308

Dated: August 1, 2000

Inventor(s): David E. Albert, Colin J. Cumming and Joel Roark

It is certified that errors appear in the above-identified patent and that said Letters Patent is hereby corrected as shown below:

Column 2, line 21, delete "ADVISORS" and insert --ADVISOR-- therefor.

Column 3, line 59, delete "Sinewave" and insert --sinewave-- therefor.

Signed and Sealed this

Twenty-second Day of May, 2001

*Attest:*

NICHOLAS P. GODICI

*Attesting Officer*   *Acting Director of the United States Patent and Trademark Office*